Jan. 23, 1934.  G. R. BAKER ET AL  1,944,148
APPARATUS FOR COATING CONFECTIONS
Filed July 15, 1932   2 Sheets-Sheet 1
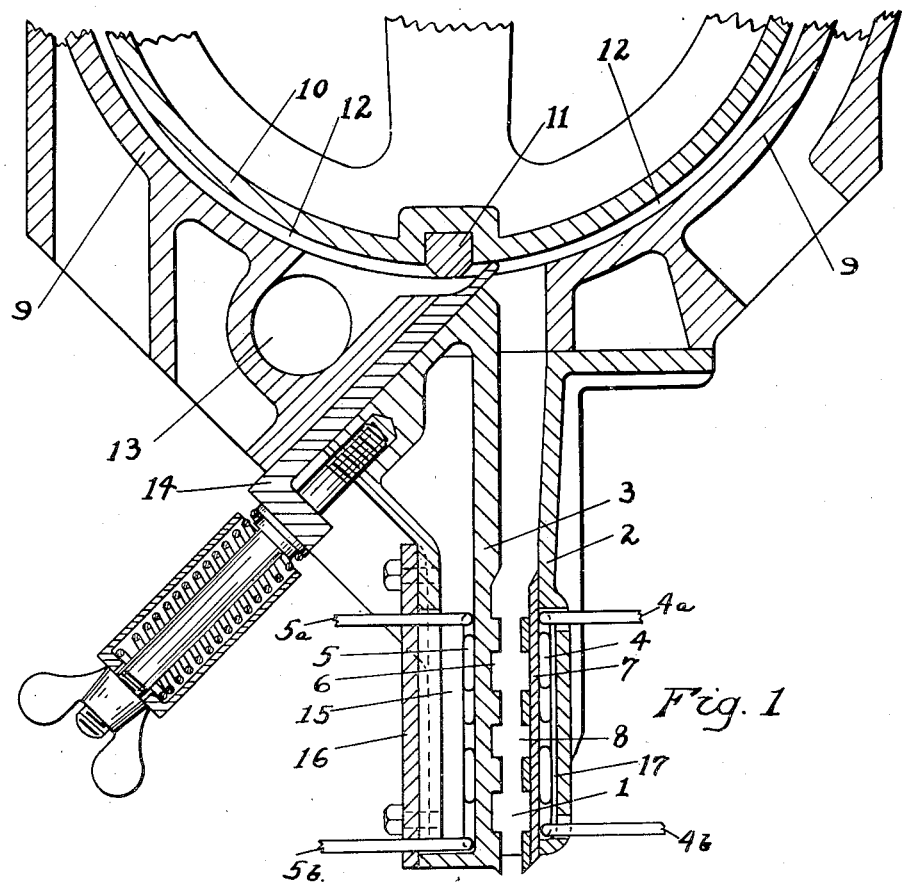
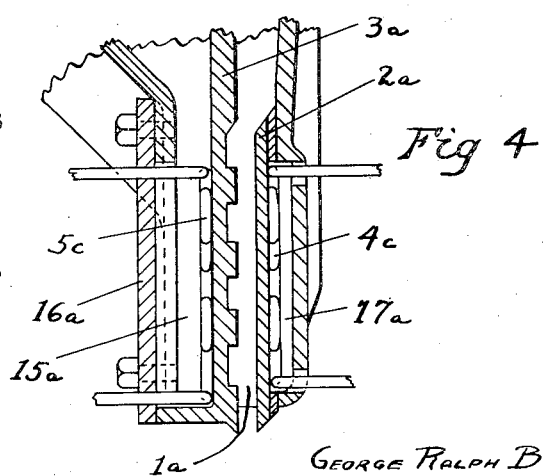
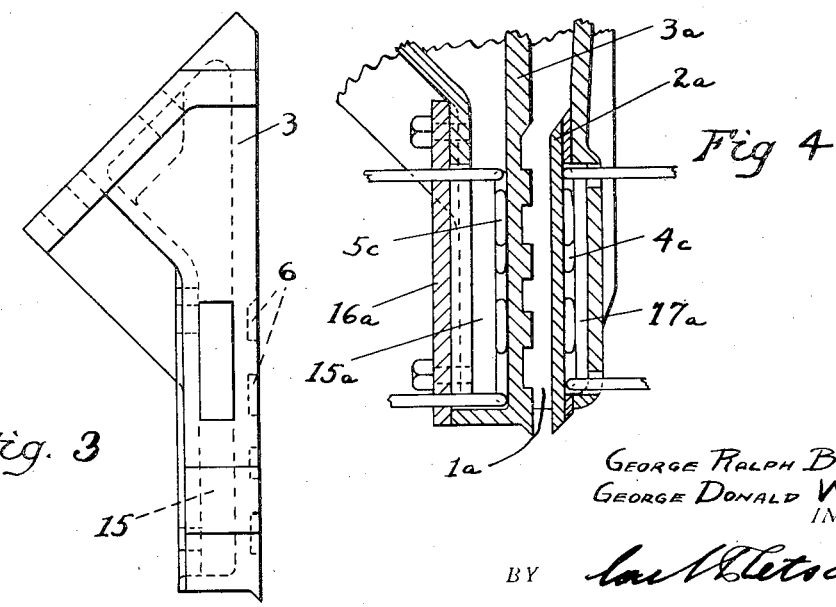
George Ralph Baker.
George Donald Wilson
INVENTORS
BY *[signature]*
ATTORNEY

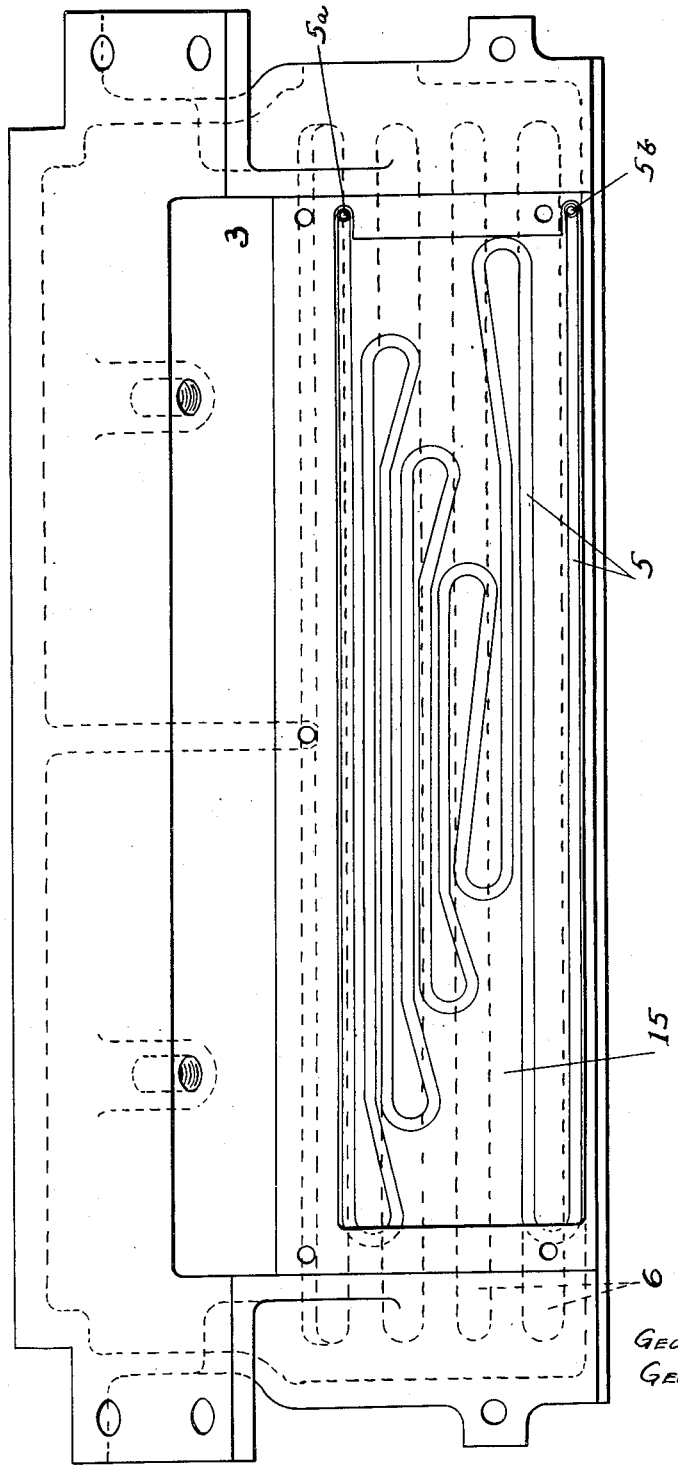

Patented Jan. 23, 1934

1,944,148

UNITED STATES PATENT OFFICE 1,944,148

APPARATUS FOR COATING CONFECTIONS

George Ralph Baker and George Donald Wilson, Willesden Junction, London, England, assignors to Baker Perkins Company, Inc., Saginaw, Mich., a corporation of New York Application July 15, 1932, Serial No. 622,672, and in Great Britain July 25, 1931

5 Claims. (Cl. 257—89)

This invention relates to an apparatus for the coating of confectionery and the like with chocolate or similar coating material and pertains more particularly to those parts of the coater which condition or treat, and form the curtain or stream of chocolate through which the goods to be coated are passed.

In our co-pending application, Ser. #522,581 filed March 14, 1931, the production of a coating curtain or stream for coating confectionery with chocolate is described, in which the side of the curtain adapted for the outside of the coating is subjected to a temperature treatment to promote graining or partial crystallization of that side only.

According to the present invention, which is a continuation in part of our above mentioned co-pending application, chocolate for employment as a coating stream or curtain for coating confectionery, is conveyed or passed in a layer which is temperature treated on both sides to produce granulation or partial granulation at the two sides.

The objects of the present invention are to provide an improved apparatus concerned with the conditioning of the chocolate and formation and delivery of the curtain or coating stream, whereby the finished goods are provided with a homogeneous coating of a satisfactory uniform character having an outside gloss or handsome texture; to securing uniformity of distribution, homogeneous consistency so as to avoid flaking or shelling of the coating; to promote solidification to set in, when the chocolate is on the goods, from the inside as well as the outside of the coating; to promote graining or partial crystallization from the cooled surfaces inwardly of the layer; to provide pockets or recesses on one or both sides of the conduit through which the curtain flows, and which pockets provide zones of solid chocolate in a condition adapted to start or promote graining of the layer under treatment, and to form a coating of a thickness approximating to that required for the goods, thereby lessening the amount of chocolate necessary for rehandling and reconditioning, which rehandling and reconditioning wears out the chocolate.

With these and certain other objects in view which will appear later in the specification, our invention comprises the devices described and claimed and the equivalents thereof.

Our present invention comprises a conduit device through which the chocolate passes in an enclosed layer of a thickness approximating that of the coating on the goods and having a circuating coil or pipe arrangement in contact with both walls of the conduit for applying a temperature treatment to the chocolate passing through the conduit.

The chocolate before being subjected to the tempering action for finally adjusting the granular condition of the curtain before discharging upon the goods, may be subjected to previous conditioning treatment to introduce well distributed granulation or partial granulation throughout the chocolate mass, for which purpose known conditioning jacketed tanks and conveyors may be employed or vaned pumping device as described in our co-pending patent application above referred to may be employed.

The invention may be accomplished in a variety of ways of which the following are examples:

The chocolate may be supplied from a suitable conditioning source to an enclosed channel conduit or elongated nozzle, at both sides (corresponding to the outside and inside surface of the curtain) of which jackets or other means are provided for a dual tempering treatment, preferably by the circulation of water of appropriate temperature. Both sides of the nozzle are provided with zones or areas including pockets of granulated or "starter" chocolate across which the chocolate is passed.

The chocolate is supplied preferably by forced feed means in a condition such that it is free from granulation but it may be at such a temperature that it is, so to say, at the threshold of granulation.

The temperatures of the liquid circulation of the treating conduit are adjusted so that with the aid of the "starter" zones each side of the chocolate layer becomes granular to an appropriate degree, the granulation effect penetrating from each side until the two in effect meet one another or leave a thin sandwiched layer of ungranulated chocolate, the granulation of which is accomplished from both internal and external sides when the coating is on the goods. It is usually preferred to adjust the condition as to the outer side of the curtain layer such that on that side the granulation is stronger than on the other (or inner) side.

As an alternative to providing an ungrained supply, a supply of chocolate having a well distributed partial graining may be provided in which case less graining effect will be required in the curtain conduit.

The lesser graining upon one side may be effected by temperature conditions or temperature conditions in conjunction with a "starter" at both sides, or the "starter" may be omitted from one side of the conduit.

In certain cases both sides of the curtain may be strongly (but not necessarily equally) grained with or without the sandwiched layer of ungrained or partially grained chocolate.

According to another mode partially grained chocolate may be supplied to the treating enclosure or conduit where the curtaining layer is treated at one side only to the graining effect so that stronger graining will be superimposed at the outer side, for example, of the curtain.

A somewhat reciprocal procedure to those above indicated may be pursued, for instance a grained or strongly grained chocolate may be supplied to the conduit and the conditions (as to temperatures and/or "starter" or grain promoting chocolate) are adjusted to "let down" the graining at one side somewhat, for example, the side to possess the lesser graining might be relatively heated.

The zones for the grained or solid chocolate may be embodied in the form of grooved or pocketed plates which (or one of which) may be made detachable so that a graining plate could be removed when not required to take part in the treatment.

Instead of employing a water jacket (or cooling circulation) at both sides of the conduit or nozzle, an air cooling or tempering effect may be utilized at one side.

The tempering means associated with the conduit may be graduated so that the intensity of the graining effect is progressive in the direction of movement of the chocolate.

In certain cases the chocolate may be fed to the conduit or nozzle by a rotary pumping device (such as described in our co-pending patent application Serial No. 522,581) wherein the chocolate may be subjected to a preparatory tempering treatment by the use of water jackets in the casing of the pump and/or in the rotor element.

It should be appreciated that latent heat released in the setting of one part of the chocolate coating will have effect upon the setting of an adjacent part and that in determining the various graining and tempering treatments for the respective sides of the chocolate for the curtain the latent heat condition of the respective sides of the curtain or coating should be allowed for or approximately balanced.

It will also be appreciated that the graining or partial graining of the chocolate on the inside of the curtain or coating has the effect of increasing the viscosity so that a chocolate with its full or usual complement of cocoa butter can be made to keep its position on the goods and is not so subject to a gravitating effect and the formation of "feet", "fins" or "tails" as in cases where this part is without graining.

Referring now to the drawings which show an illustrative embodiment of our invention:—

Figure 1 is a cross section of a curtain forming conduit.

Figure 2 is a side view of an element forming one wall of the conduit and illustrating one form of means for cooling said wall.

Figure 3 is an end view of said element looking from right to left in Figure 2.

Figure 4 is the fragment of a section of the lower part of a conduit similar to Figure 1 showing a modified arrangement of the conditioning means.

In carrying the invention into effect by the aid of the apparatus illustrated, chocolate from a suitable conditioning source is supplied to an enclosed channel conduit 1, the lower part of which closely approximates the thickness of the coating when it has been applied to the goods. The conduit 1 is formed between plates or walls 2 and 3 and at both sides (corresponding to the outside and inside surface of the curtain) means are provided for supplying a dual tempering treatment to the curtain. This treatment may be effected by circulation coils or pipes 4 and 5, through which water, or other cooling mediums may be circulated.

The coils 4 and 5 are preferably independent of one another so that different temperature treatments may be applied to the sides of the layer of chocolate.

Both walls 2 and 3 of the conduit 1, may be provided with pockets or recesses for containing solid or "starter" chocolate with which the layer contacts after it flows through the conduit. Thus, the inner surface of the wall 3, is provided with recesses 6, extending transversely to the direction of flow of the layer or curtain. The other wall 2, may be provided with similar recesses or pockets or as shown a graining plate 7, may be provided having recesses 8. As an alternative the wall 3 may also be provided with a graining plate. The graining plate 7 is made detachable so that it may be removed when not required to take part in the temperature treatment.

The chocolate may be fed to the conduit or nozzle 1, by a rotary pumping device (such as described in our co-pending application #522,581) wherein the chocolate may be subjected to a preparatory tempering treatment by the use of water jackets in the casing of the pump and/or in the rotor element.

Referring to Figure 1, the rotary pump comprises a cylindrical casing 9 in which a rotor 10 rotates. The rotor 10 is provided with a number of spaced blades or vanes 11, dividing the space between the rotor 10 and casing 9 into a number of curved spaces 12.

The pump is supplied with chocolate under pressure at the inlet 13, and operates to convey layers of chocolate to the upper end of the conduit 1.

The spaced vanes 11 cooperate with a spring pressed abutment 14, which is pressed outwardly by the vanes as the latter rotates past the abutment 14.

The wall elements 2 and 3 of the nozzle or conduit 1 are mounted upon the pump casing 9, the plane of the conduit 1 lying parallel to the axis of rotation of the pump.

Consequently, the wall element 3 forms part of the housing for the abutment 14. The wall 3 is of hollow form, enclosing a recess 15 in which the fluid circulating coil 5 is accommodated. The recess 15 is closed by a cover plate 16, through apertures in which the ends 5a—5b of the coil 5 project. The coil 5 is preferably of flat serpentine form as shown in Figure 2, and in order to obtain efficient conduction of heat between the coil 5 and the wall 3 the coil is preferably secured to the wall by welding or brazing.

The coil 4 is also of flat serpentine form and is similarly secured to the graining plate 7, being located within a recess 17 of the wall element 2, the ends 4a—4b of the coil 4 projecting through apertures in said wall 2. Obviously the wall 2 may be constructed with the recess containing the cooling coil similar to the wall 3 or alternatively the wall 3 may have a removable graining plate for a circulating coil similar to the wall 2.

Instead of the coils being of flat form, they may be arranged in any other convenient manner. Further, instead of coil pipes, circulating grooves may be made in the wall of the conduit.

Referring now to Figure 4 which shows a modified form of the conduit, it may be desirable in some cases to have the curtain contact on one side only with the solid or "starter" chocolate in the grooves.

In the arrangement shown in Figure 4 the grooves are omitted from one of the walls as 2a and the circulating coils 5c transmit their cooling effect directly against that side of the curtain.

By the above described means we have produced a curtain forming conduit wherein the temperature treatment of the coating curtain may be very carefully and closely regulated for the varying conditions which confront the manufacture of confectionery.

For example, when it was desired to coat very soft cream centers it was customary to use a dense coating to prevent the soft center from melting, and settling or bulging and leaking.

With our present invention these soft centers may now be coated with a soft coating because the side next to the center will solidify before the center has a chance to melt, thereby producing a confection of uniform size and shape.

Furthermore, when very large confections were coated heretofore it was customary to double coat the goods; that is, pass them through a coater a second time and after the first coating had set.

With our present invention a coating curtain of sufficient thickness may be used without danger of the coating material running off the goods and leaving thin or bald spots and forming "feet", "fins" and "tails".

Further, the treatment of the coating curtain on both sides so sets the cocoa butter that its uniform distribution throughout the chocolate is not disturbed and the coated goods may be kept much longer without turning gray or spotted.

Having thus described our invention what we claim and desire to secure by Letters Patent is:

1. An apparatus for coating confections and the like comprising an elongated conduit through which a curtain of coating material flows, the walls of said conduit being spaced apart a distance approximating the thickness of the coating after it is applied to the confections, temperature controlling fluid coils adjacent the walls of said conduit to promote the degree of graining of both sides of the coating material before it is applied to the confections and recesses on the inner surfaces of said walls, said recesses extending transversely to the flow of the coating material for containing a solid or "starter" coating material to assist in the graining of the curtain of coating material.

2. An apparatus for coating confections and the like comprising an elongated conduit through which a curtain of coating material flows, the walls of said conduit being spaced apart a distance approximating the thickness of the coating after it is applied to the confections, means for admitting a temperature controlling fluid adjacent the walls of said conduit to promote the degree of graining of both sides of the coating material before it is applied to the confections, and recesses on the inner surfaces of said walls, said recesses extending transversely to the flow of the curtain of coating material for containing a solid or "starter" coating material to assist in the graining of the curtain of coating material.

3. An apparatus for coating confections and the like comprising an elongated conduit through which a curtain of coating material flows, the walls of said conduit being spaced apart a distance approximating the thickness of the coating after it is applied to the confections, temperature controlling fluid coils adjacent the walls of said conduit to promote the degree of graining of both sides of the coating material before it is applied to the confections, and recesses on the inner surface of at least one of said walls, said recesses extending transversely to the flow of the curtain of coating material for containing a solid or "starter" coating material to assist in the graining of the curtain of coating material.

4. An apparatus for coating confections and the like comprising an elongated conduit through which a curtain of coating material flows, the walls of said conduit being spaced apart a distance approximating the thickness of the coating after it is applied to the confections, means for admitting a temperature controlling fluid adjacent the walls of said conduit to promote the degree of graining of both sides of the coating material before it is applied to the confections, and recesses on the inner surface of at least one of said walls, said recesses extending transversely to the flow of the curtain of coating material for containing a solid or "starter" coating material to assist in the graining of the curtain of coating material.

5. An apparatus for coating confections and the like comprising an elongated conduit through which a curtain of coating material flows, the walls of said conduit being spaced apart a distance approximating the thickness of the coating after it is applied to the confections, means for admitting a temperature controlling fluid adjacent the walls of said conduit to promote the degree of graining of both sides of the coating material before it is applied to the confections, and recesses on the inner surface of at least one of said walls for containing a solid or "starter" coating material to assist in the graining of the coating material.

GEORGE RALPH BAKER.
GEORGE DONALD WILSON.